US009475212B2

(12) United States Patent
Ho

(10) Patent No.: US 9,475,212 B2
(45) Date of Patent: Oct. 25, 2016

(54) MOLD VACUUM VALVE DEVICE

(71) Applicant: Everinn International Co., Ltd., Taichung (TW)

(72) Inventor: Yu-Pei Ho, Taichung (TW)

(73) Assignee: Everinn International Co., Ltd., Taichung (TW)

( * ) Notice: Subject to any disclaimer, the term of this patent is extended or adjusted under 35 U.S.C. 154(b) by 410 days.

(21) Appl. No.: 14/215,746

(22) Filed: Mar. 17, 2014

(65) Prior Publication Data
US 2015/0258714 A1   Sep. 17, 2015

(51) Int. Cl.
*B29C 33/10* (2006.01)
*B29C 45/34* (2006.01)
*B29C 33/04* (2006.01)

(52) U.S. Cl.
CPC .............. *B29C 33/10* (2013.01); *B29C 45/34* (2013.01); *B29C 33/04* (2013.01)

(58) Field of Classification Search
CPC ........ B29C 45/34; B29C 33/04; B29C 33/10
USPC .......... 425/190, 192 R, 405.1, 546, DIG. 60, 425/812
See application file for complete search history.

(56) References Cited

U.S. PATENT DOCUMENTS

| | | | | |
|---|---|---|---|---|
| 4,154,285 A * | 5/1979 | Yamasaki | ............ | B22D 17/14 164/133 |
| 4,708,314 A * | 11/1987 | Kuhling | ............ | B29C 33/428 164/229 |
| 4,790,739 A * | 12/1988 | Manfredi | ............ | B28B 3/021 425/192 R |
| 4,938,274 A * | 7/1990 | Iwamoto | ............ | B22D 17/145 164/151.1 |
| 5,586,596 A * | 12/1996 | Freeman | ............ | B22D 17/145 164/253 |
| 5,913,356 A * | 6/1999 | Muramatsu | .......... | B22D 17/145 164/305 |
| 6,027,325 A * | 2/2000 | Piotrowski | ............ | B29C 49/42 425/192 R |
| 6,378,596 B1 * | 4/2002 | Arrigotti | ............ | B22D 17/145 164/305 |
| 6,471,501 B1 * | 10/2002 | Shinma | .................. | B29C 43/36 257/E21.504 |
| 7,258,539 B2 * | 8/2007 | Lowe | .................. | B29C 45/1743 425/192 R |
| 7,841,059 B2 * | 11/2010 | Mizuno | ................. | B29C 33/305 164/342 |
| 2015/0042013 A1 * | 2/2015 | Kawaguchi | ............ | B29C 59/02 264/293 |

* cited by examiner

*Primary Examiner* — Alison L Hindenlang
*Assistant Examiner* — Emmanuel S Luk
(74) *Attorney, Agent, or Firm* — Frommer Lawrence & Haug LLP

(57) ABSTRACT

A mold vacuum valve device includes a first mold having a mounting hole formed therethrough, a second mold connected to the first mold, and a sliding block. The second mold has a shaping cavity, a runner passage in fluid communication with a side of the shaping cavity, and a vacuum passage in fluid communication with an opposite side of the shaping cavity. The shaping cavity is defined by a serrated bottom wall surface, and cooperates with the mounting hole to define an accommodating space. The sliding block is disposed movably within the accommodating space, and has a head portion and a body portion. The head portion has a serrated side surface complementary to the serrated bottom wall surface. The head portion cooperates with the second mold to define a shaping clearance.

8 Claims, 10 Drawing Sheets

MOLD VACUUM VALVE DEVICE

BACKGROUND OF THE INVENTION

1. Field of the Invention

This invention relates to a vacuum valve device, and more particularly to a mold vacuum valve device for automatically obstructing discharge of molten material and air.

2. Description of the Related Art

Referring to FIGS. 1 and 2, a conventional mold vacuum valve device 8 disclosed in Taiwanese Patent No. 201231189 includes a first mold unit 81, a second mold unit 82, and a sliding block unit 83.

The first mold unit 81 includes a first mold body 811 and two resilient members 812. The first mold body 811 has a curved sliding surface 813 facing toward the second mold unit 82, a runner passage 814 and a vacuum passage 815. The runner passage 814 and the vacuum passage 815 are formed respectively in two opposite lateral sides of the first mold body 811. The sliding surface 813 is formed with position limiting groove 816. The first mold body 811 further has two holes 817 each extending along a direction parallel to the vacuum passage 815 and receiving the corresponding resilient member 812.

The second mold unit 82 includes a second mold body 821 having a serrated side surface 822 that faces toward the sliding block unit 83 and that is formed with a plurality of teeth 823. The serrated side surface 822 cooperates with the curved sliding surface 813 to define an accommodating space (I).

The sliding block unit 83 includes a sliding block 831, a plurality of balls 832, a roller 833, and two adjustment bolts 834. The sliding block 831 is disposed movably in the accommodating space (I), has a toothed portion 835 complementary to the serrated side surface 822 to define a shaping clearance (II) therebetween, and is movable on the curved sliding surface 813 along a direction parallel to the teeth 623. The shaping clearance (II) has two opposite ends in fluid communication with the runner passage 814 and the vacuum passage 815, respectively. The sliding block 831 further includes two restricting grooves 836 each receiving a plurality of the balls 832 to facilitate smooth movement of the sliding block 831 on the curved sliding surface 813, and a position-limiting protrusion 837 disposed on the restricting grooves 836 and engaging the position-limiting groove 816 in the first mold body 811. The roller 833 is disposed rotatably on a middle portion of the position-limiting protrusion 837 for contact with a wall of the first mold body 811 defining the position-limiting groove 816. The position-limiting protrusion 837 is biased by the resilient member 812 such that the sliding block 831 is moved toward the runner passage 814, and is formed with two threaded holes 838. The adjustment bolts 834 are engaged respectively into the threaded holes 838, and abut against the wall of the first mold body 811 defining the position-limiting groove 816. The adjustment bolts 834 are rotatable relative to the threaded holes 838 to adjust the size of the shaping clearance (II).

As such, when molten material flows into the accommodating space (I) through the runner passage 814, the sliding block 831 can be moved by the molten material to close the vacuum passage 815.

However, the aforesaid conventional mold vacuum valve device 8 suffers from the following disadvantages:

1. Since the position-limiting groove 816 and the position-limiting protrusion 837 are L-shaped, two retaining blocks 84 are needed to confine the sliding block unit 83 within the position-limiting groove 816. Consequently, the number of the components of the mold vacuum valve device 8 is increased, thereby resulting in an increase in the manufacturing cost and the assembly cost.

2. Since the sliding surface 813 is curved, a resistance to movement of the sliding block 831 on the sliding surface 813 is increased. Consequently, the sliding block 831 cannot move smoothly.

SUMMARY OF THE INVENTION

The object of this invention is to provide a mold vacuum valve device for automatically obstructing discharge of molten material and air, which can overcome the above-mentioned disadvantages associated with the prior art.

According to this invention, a mold vacuum valve device includes a first mold having a mounting hole formed therethrough, a second mold connected to the first mold, and a sliding block. The second mold has a shaping cavity, a runner passage in fluid communication with a side of the shaping cavity, and a vacuum passage in fluid communication with an opposite side of the shaping cavity. The shaping cavity is defined by a serrated bottom wall surface, and cooperates with the mounting hole to define an accommodating space. The sliding block is disposed movably within the accommodating space, and has a head portion and a body portion. The head portion has a serrated side surface complementary to the serrated bottom wall surface. The head portion cooperates with the second mold to define a shaping clearance.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 3:
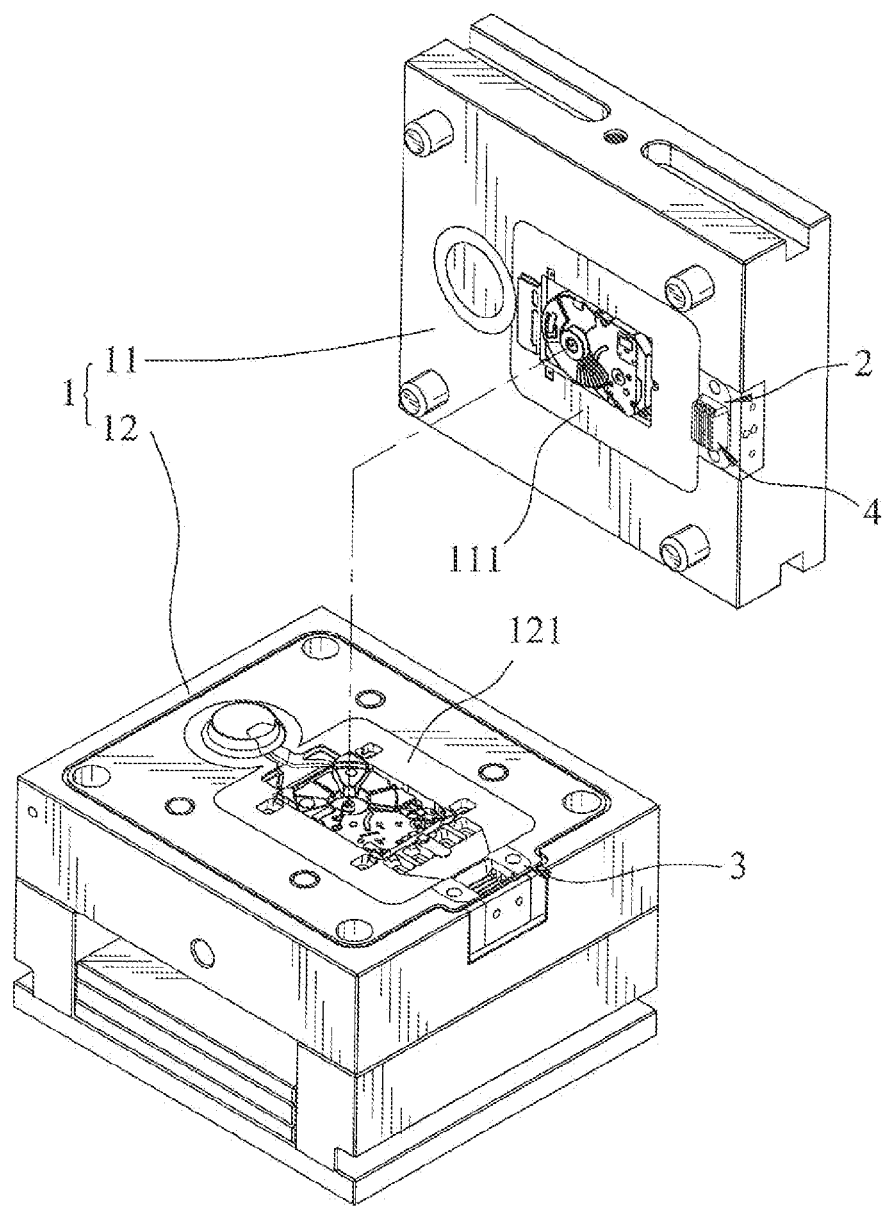
FIG. 3 is an exploded perspective view of a mold assembly including the preferred embodiment of a mold vacuum valve device according to this invention.
Figure 4:
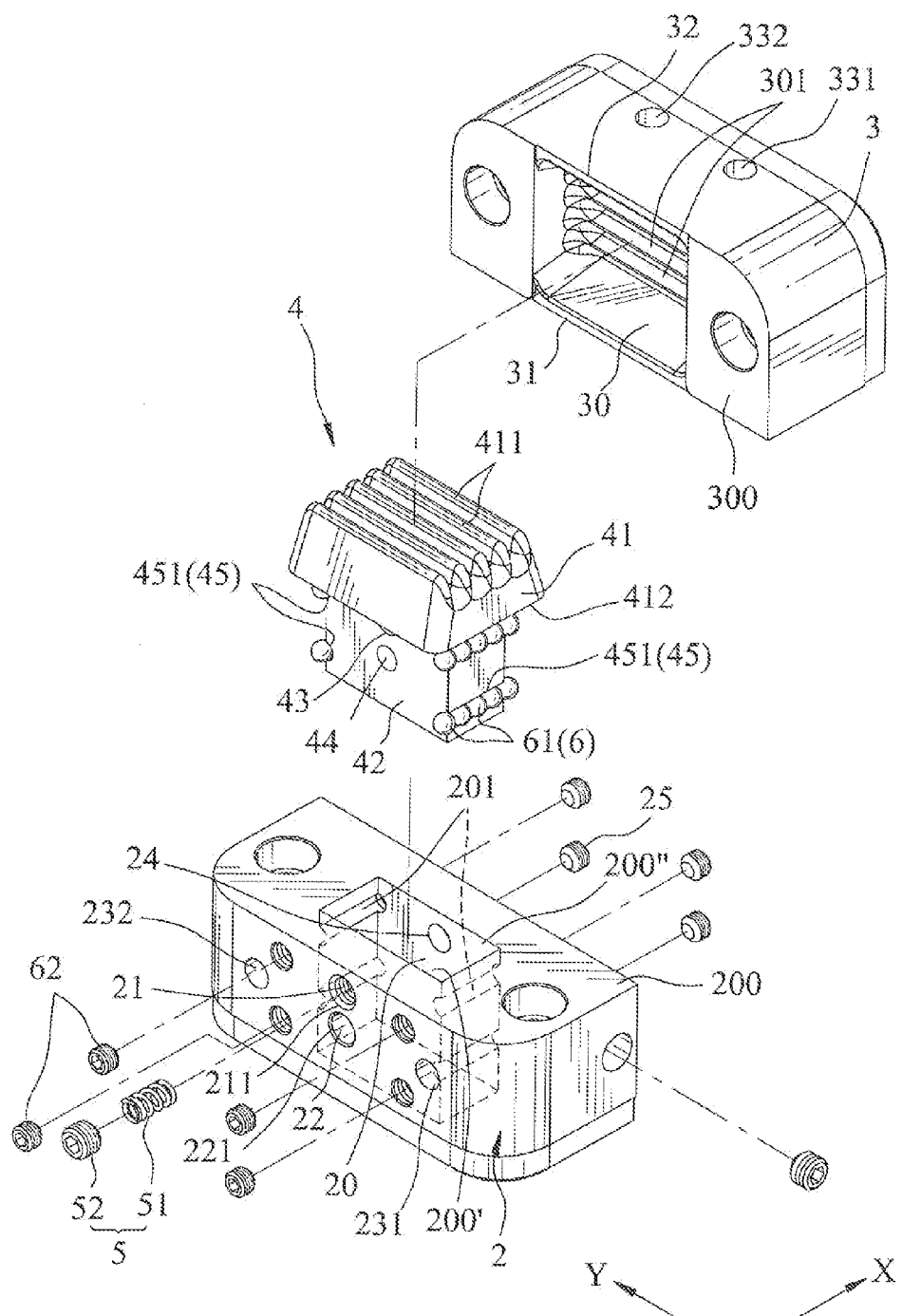
FIG. 4 is a partly exploded perspective view of the preferred embodiment.
Figure 5:
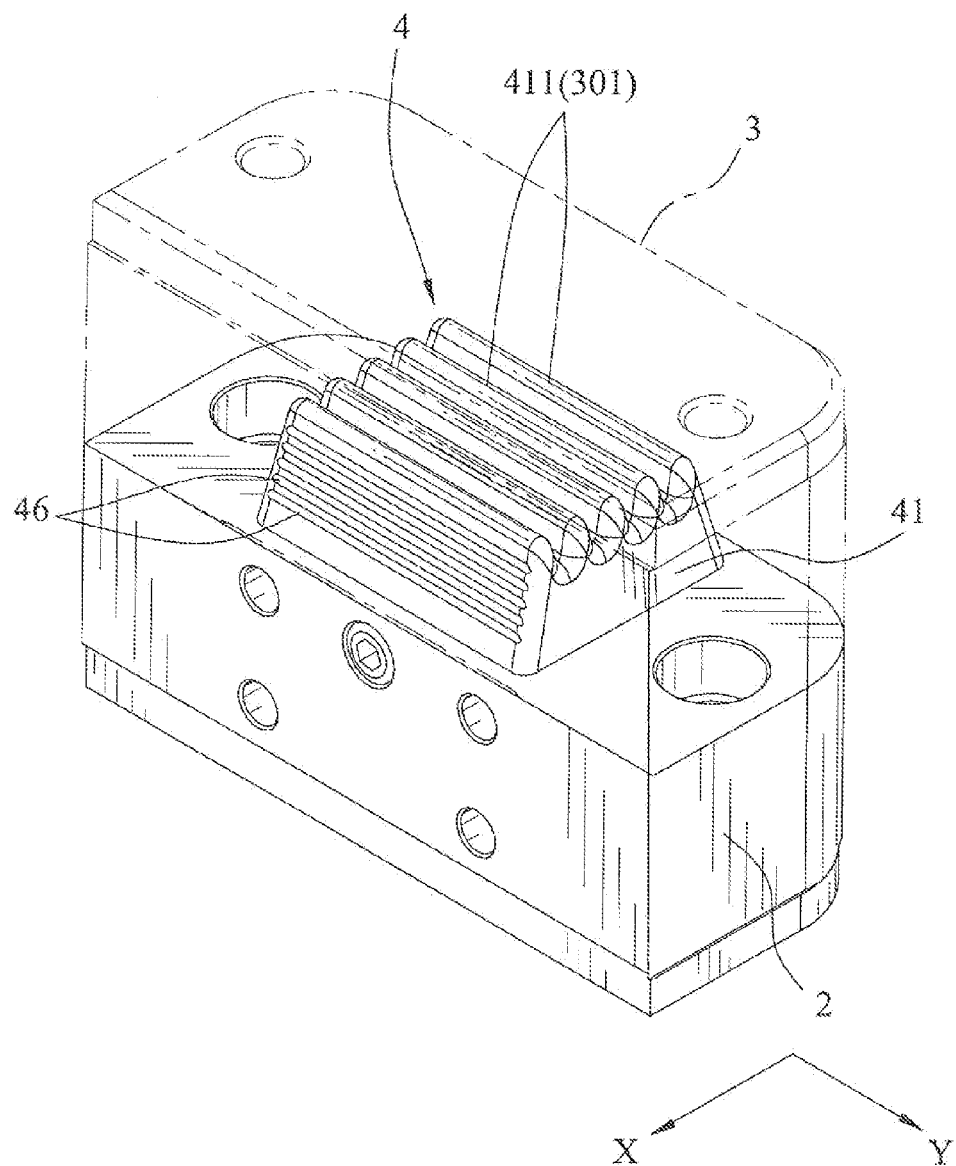
FIG. 5 is an assembled perspective view of the preferred embodiment.

Referring to FIGS. 3, 4, and 5, the preferred embodiment of a mold vacuum valve device according to this invention is mounted to a mold unit 1. The mold unit 1 includes an upper mold 11 and a lower mold 12. Each of the upper and lower molds 11, 12 has a mold cavity 111, 121. The mold vacuum valve device includes a first mold 2, a second mold 3, a sliding block 4, a biasing unit 5, and a rolling unit 6. The first mold 2 is disposed in the mold cavity 111 in the upper mold 11. The second mold 3 is disposed in the mold cavity 121 in the lower mold 12. When the upper and lower molds 11, 12 are interconnected, the first and second molds 2, 3 abut against each other.

Figure 6:
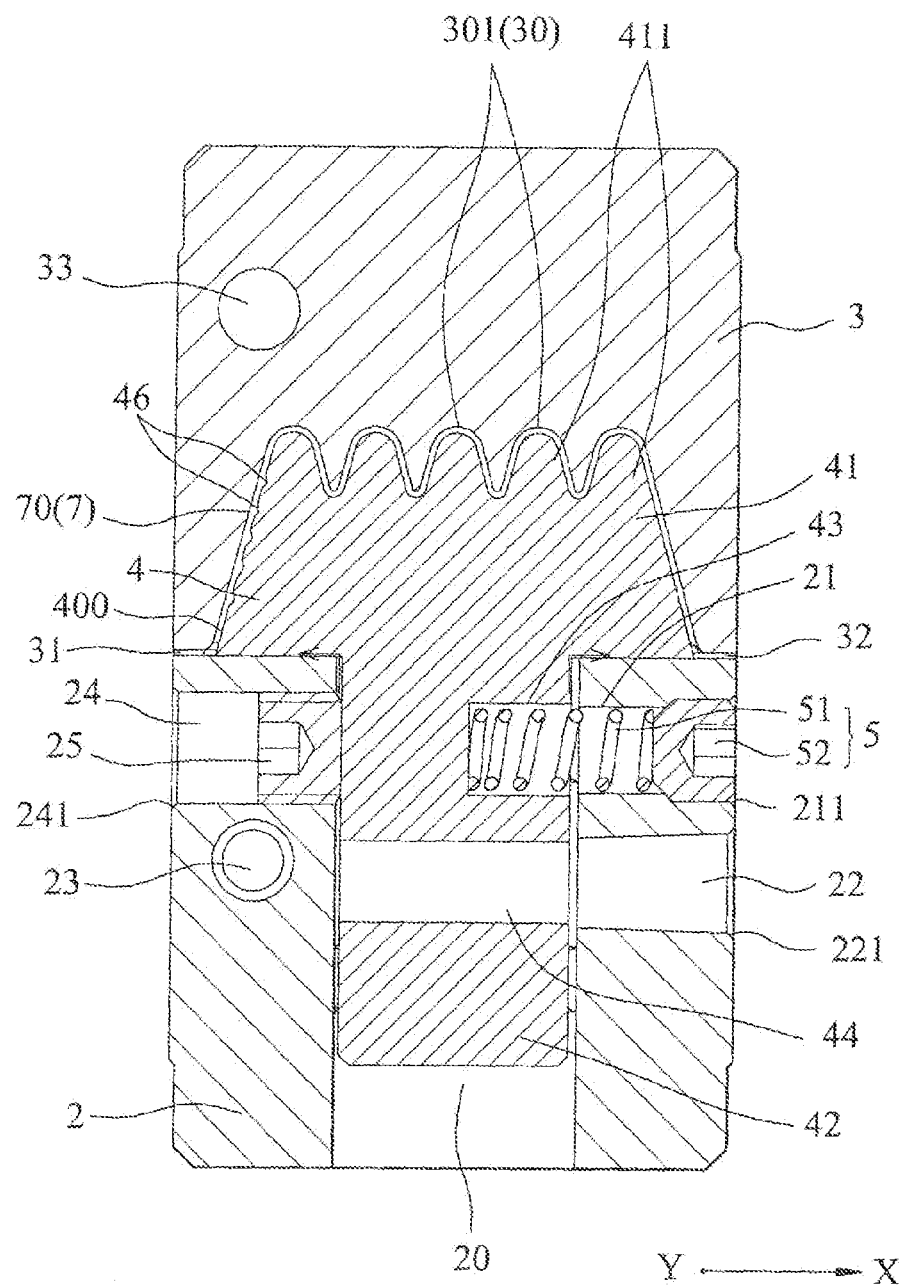
FIG. 6 is a sectional view of the preferred embodiment, illustrating that an adjustment bolt is rotatable within a threaded hole to adjust the size of a shaping clearance.
Figure 7:
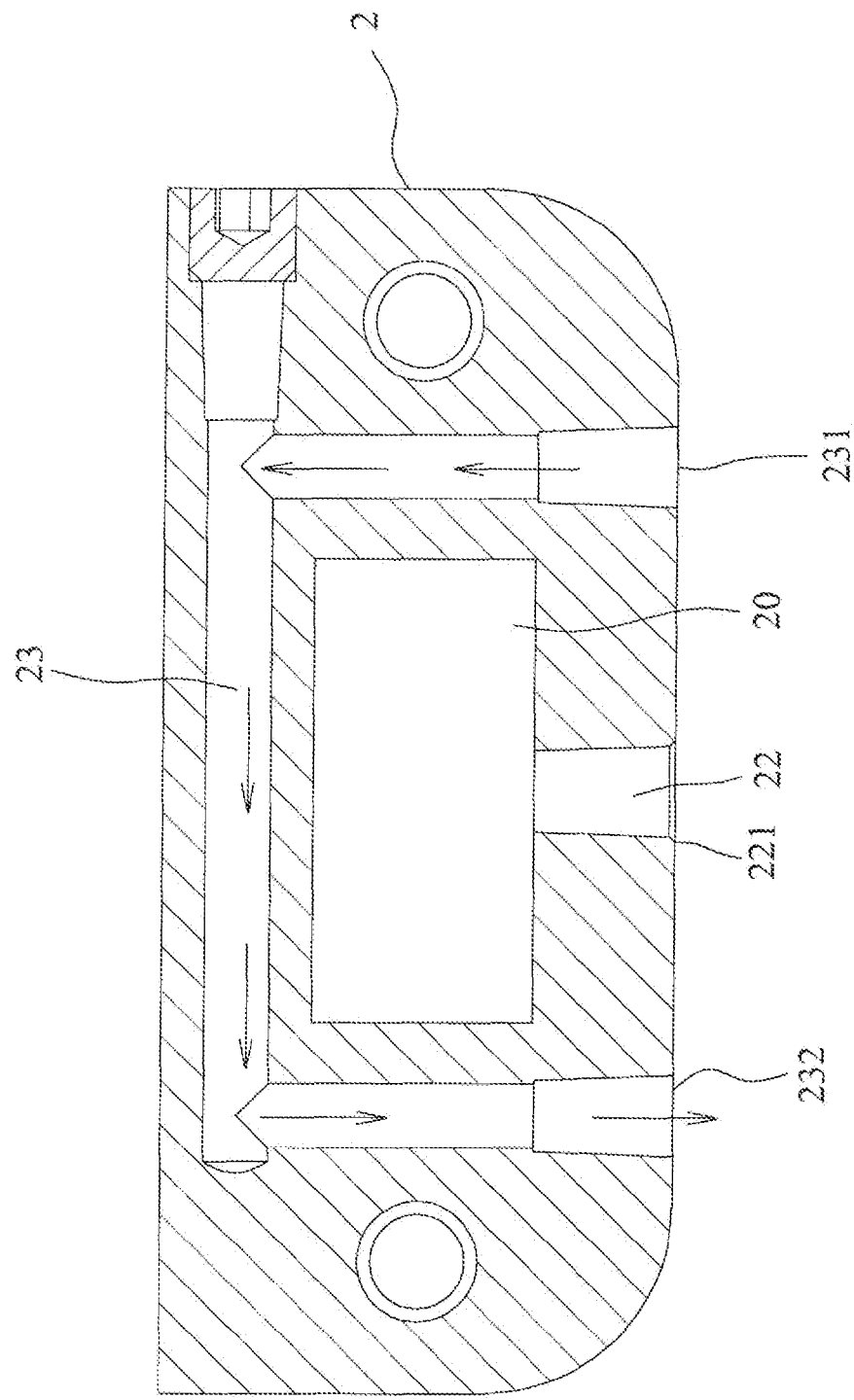
FIG. 7 is a sectional view of the preferred embodiment, illustrating that a first coolant passage is disposed around a mounting hole.
Figure 9:
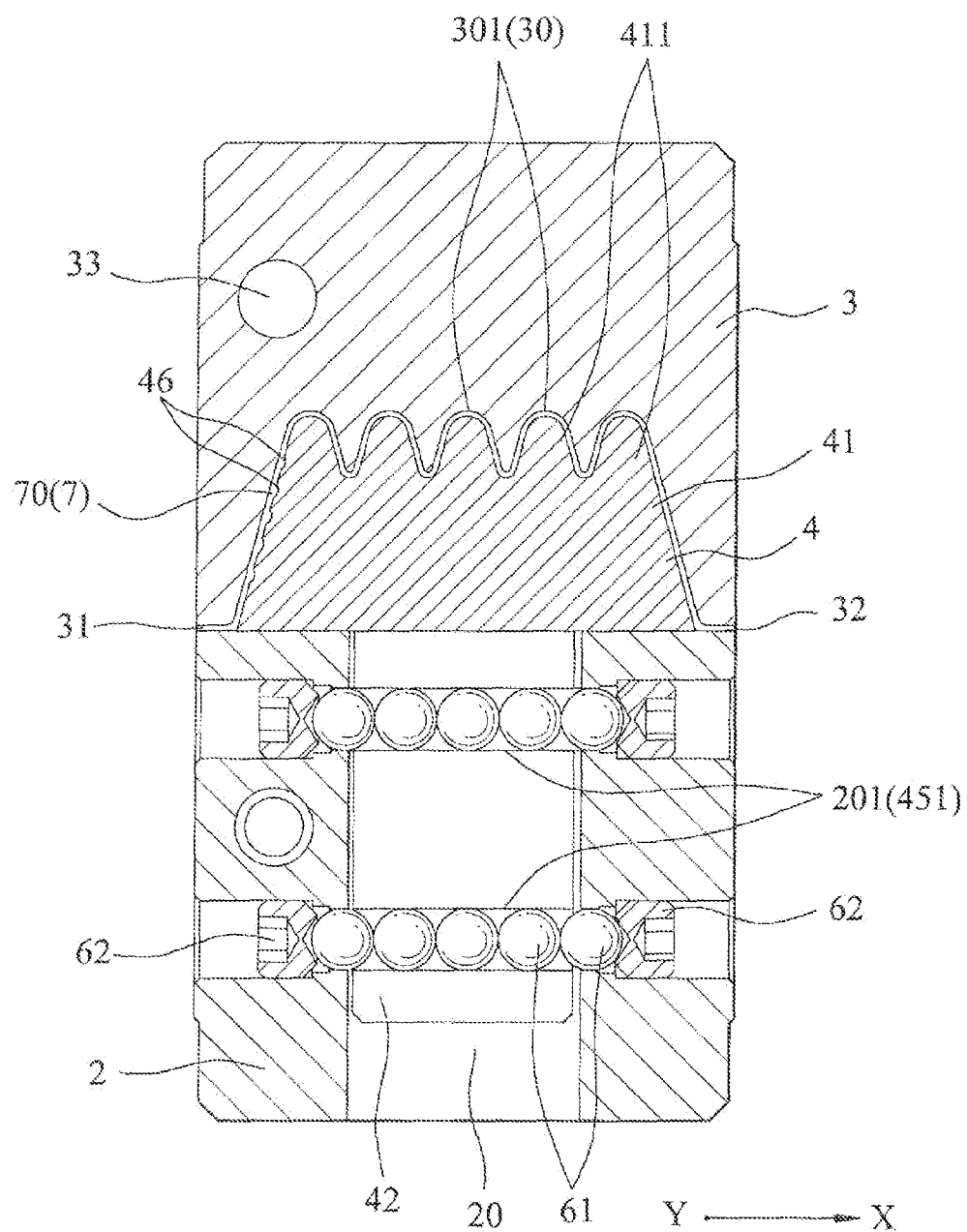
FIG. 9 is a sectional view of the preferred embodiment, illustrating an initial position of a sliding block.

With further reference to FIGS. 6, 7, and 9, the first mold 2 includes a cubic mounting hole 20 that is formed therethrough and that is sealed by the lower mold 12, a flat inner side surface 200 proximate to the second mold 3, opposite first and second sidewalls 200', 200" defining the mounting hole 20 therebetween, a spring-receiving hole 21 formed through the first sidewall 200' along a first direction (X), an intake passage 22 formed through the first sidewall 200' along the first direction (X), a first coolant passage 23 disposed around the mounting hole 20, a threaded hole 24 formed through the second sidewall 200" along the first direction (X) and aligned with the spring-receiving hole 21, and an adjustment bolt 25 engaged within the threaded hole 24 and extending into the mounting hole 20. The spring-receiving hole 21 has an inner end in fluid communication with the mounting hole 20, and a threaded outer end 211. The mounting hole 20 has a plurality of ball-receiving hole portions 201 at two opposite lateral sides thereof. The ball-receiving hole portions 201 located at the same side are arranged one above another, and extend along the first direction (X). The intake passage 22 has inner end in fluid communication with the mounting hole 20, and an outer end adapted to be connected fluidly to an air pump (not shown). The first coolant passage 23 has two ends 231, 232 adapted to be connected fluidly to a coolant circulation device (not shown). The threaded hole 24 has an inner end in fluid communication with the mounting hole 20, and an outer end 241 permitting insertion of the adjustment bolt 25.

Figure 8:
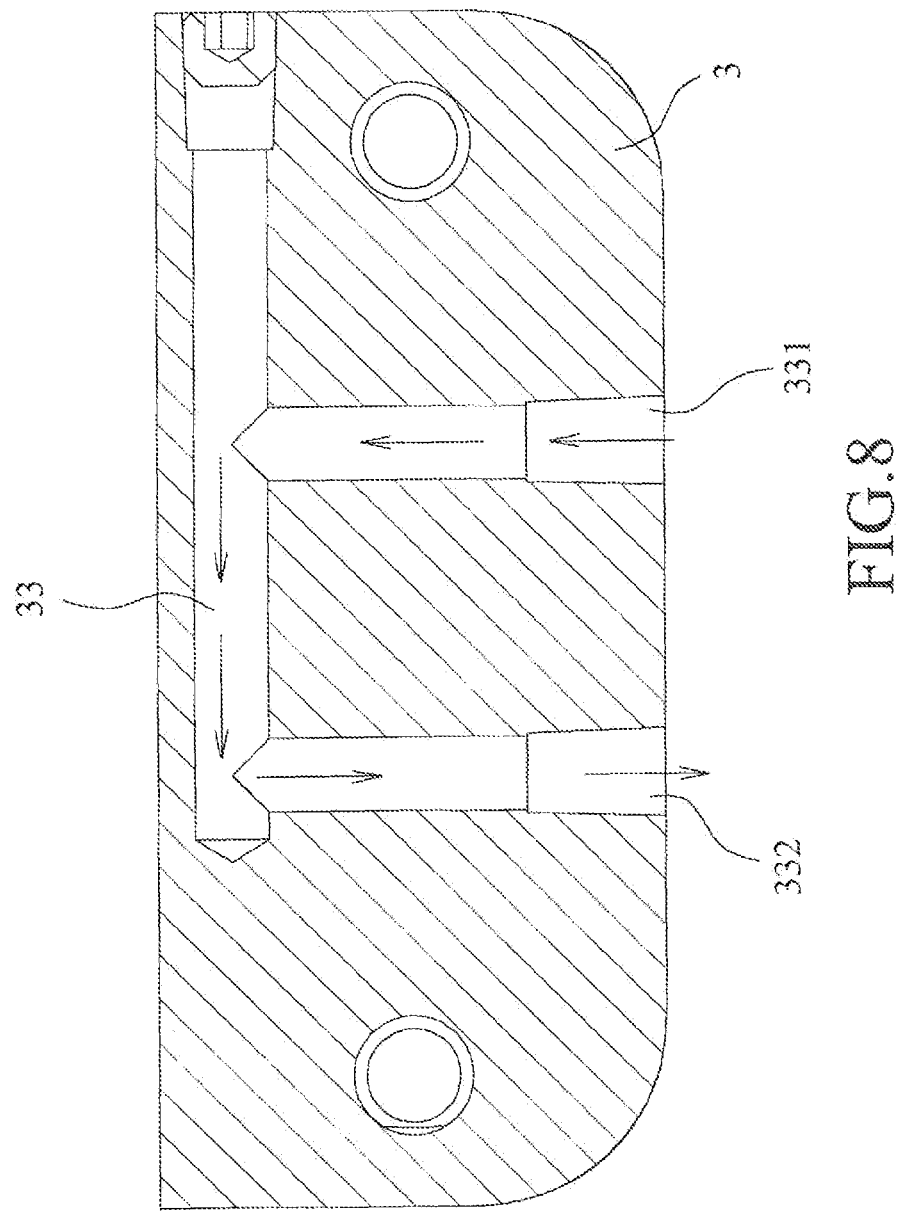
FIG. 8 is a sectional view of the preferred embodiment, illustrating that a second coolant passage is disposed around a shaping cavity.

The second mold 3 has an inner side surface 300 abutting against the inner side surface 200 of the first mold 2, and has a shaping cavity 30 formed in the inner side surface 300 thereof, a runner passage 31 in fluid communication with a side of the shaping cavity 30, and a vacuum passage 32 in fluid communication with an opposite side of the shaping cavity 30. The shaping cavity 30 is defined by a serrated bottom wall surface 301 formed with a plurality of shaping teeth arranged along the first direction (x) and disposed between the runner passage 31 and the vacuum passage 32. The runner passage 31 and the vacuum passage 32 are in fluid communication with the mold unit 1 and a vacuum device (not shown). The shaping cavity 30 in the second mold 3 cooperates with the mounting hole 20 in the first mold 2 to define an accommodating space 7. With further reference to FIG. 8, the second mold 3 further includes a second coolant passage 33 disposed around the shaping cavity 30. The second coolant passage 33 has two ends 331, 332 connected to the coolant circulation device.

Figure 10:
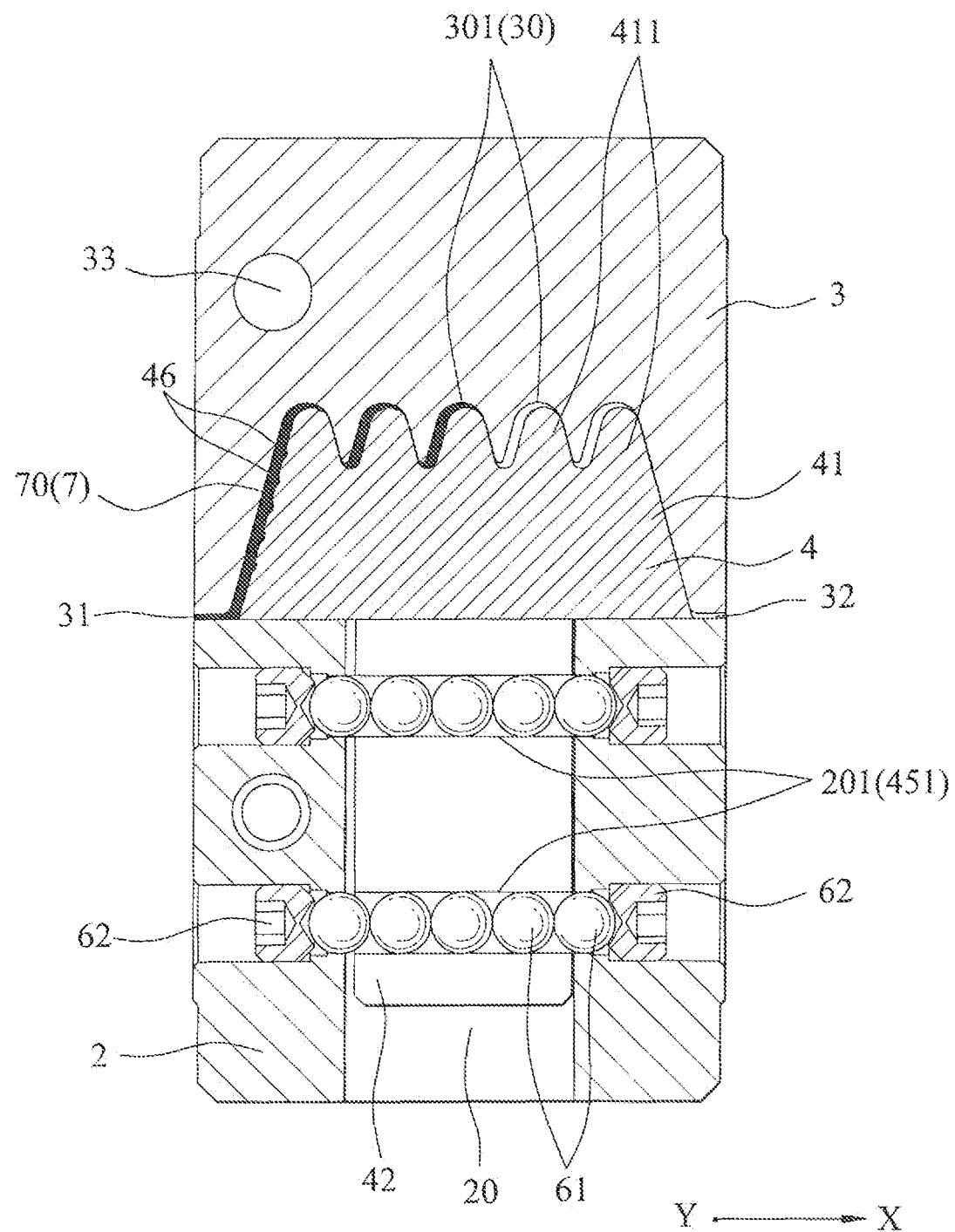
FIG. 10 is a sectional view of the preferred embodiment, illustrating a closing position of the sliding block.

The sliding block 4 is movable in the accommodating space 7 along the first direction (X) between an initial position shown in FIG. 9 whereat the vacuum passage 32 is opened, and a closing position shown in FIG. 10 whereat the vacuum passage 32 is closed. In this embodiment, the sliding block 4 includes a head portion 41 having a serrated side surface 411 and a non-serrated side surface 412 that is opposite to the serrated side surface 411 and that is contactable with the inner side surface 200 of the first mold 2, a body portion 42 extending upwardly from the non-serrated side surface 412 of the head portion 41 and disposed within the mounting hole 20, a blind hole 43 formed in the body portion 42 and aligned with the spring-receiving hole 21 in the first mold 21, an airflow guiding hole 44 formed through the body portion 42 and aligned with and adjacent to the intake passage 22 for accelerating airflow in the mounting hole 20, a ball-receiving unit 45 including a plurality of ball-receiving grooves 451 formed in two opposite lateral surfaces and aligned respectively with the ball-receiving hole portions 201 of the mounting hole 20 in the first mold 2, an inclined proximate side surface 400 adjacent to the runner passage 31, and a plurality of grooves 46 formed in the proximate side surface 400 and extending along a second direction (Y) perpendicular to the first direction (X).

The serrated side surface 411 of the head portion 41 is complementary to the serrated bottom wall surface 301. The head portion 41 cooperates with the second mold 2 to define shaping clearance 70 therebetween. The shaping clearance 70 has two opposite ends in fluid communication with the runner passage 31 and the vacuum passage 32, respectively.

With particular reference to FIG. 9, when the sliding block 4 is disposed at the initial position, the serrated aide surface 411 of the sliding block 4 is spaced apart from the serrated bottom wall surface 301, such that the runner passage 31 is in fluid communication with the vacuum passage 32. With particular reference to FIG. 10, when the sliding block 4 is disposed at the closing position, the serrated side surface 411 is in contact with an inner surface of the second mold 3 adjacent to the vacuum passage 32 so as to close fluid communication between the vacuum passage 32 and the runner passage 31 via the shaping clearance 70.

The biasing unit 5 includes a return spring 51 and a positioning bolt 52. The return spring 51 has two opposite ends that are disposed respectively within the blind hole 43 in the sliding block 4 and the spring-receiving hole 21 in the first mold 2. The positioning bolt 52 is threaded into the threaded outer end 211 of the spring-receiving hole 21 for confining the return spring 51 in the blind hole 43 and the spring-receiving hole 21. The return spring 51 biases the body portion 42 of the sliding block 4 to contact the adjustment bolt 25, thereby allowing the sliding block 4 to be retained at the initial position. The adjustment bolt 25 is rotatable within the threaded hole 24 to adjust the size of the shaping clearance 70.

The rolling unit 6 is disposed between the first mold 2 and the sliding block 4, and includes a plurality of balls 61 and a plurality of position-limiting screws 62. Each ball 61 engages a corresponding ball-receiving hole portion 201 and a corresponding ball-receiving groove 451. The position-limiting screws 62 are threaded respectively into ends of the ball-receiving grooves 451 to confine the balls 61 within the hall-receiving grooves 451.

During molding, with particular reference to FIGS. 5 and 6, the air pump is actuated to supply compressed air into the mounting hole 20 via the intake passage 22 in the first mold 2, so that the compressed air flows from the mounting hole 20 into the runner passage 31 and the vacuum passage 32 through spaces between the non-serrated side surface 412 of the head portion 41 of the sliding block 4 and the inner side surface 200 of the first mold 2. Hence, two laminar flows are formed to separate the non-serrated side surface 412 of the head portion 41 of the sliding block 4 from the inner side surface 200 of the first mold 2, thereby avoiding occurrence of frictional force therebetween during movement of the sliding block 4 along the first direction (X).

At the same time, with particular reference to FIGS. 7 and 8, the coolant circulation device is also actuated to allow a coolant to circulate in the first coolant passage 23 in the first mold 2 and the second coolant passage 33 in the second mold 3 to maintain the mold vacuum valve device within an appropriate work temperate range. As such, abnormal operation of the mold vacuum valve device due to excessively high temperature can be prevented.

Subsequently, with reference to FIG. 9, the molten material flows from the mold cavities 111, 121 in the mold unit 1 into the runner passage 31 and the shaping clearance 70.

Thereafter, with particular reference to FIG. 10, the molten material flows into the shaping clearance 70 to push the serrated side surface 411 of the sliding block 4 to move toward the vacuum passage 32 along the first direction (X). Hence, the serrated side surface 411 of the sliding block 4 comes into contact intimately with the inner surface of the second mold 3 to close the vacuum passage 32. During flow of the molten material in the shaping clearance 70, as soon as the molten material flows past a tooth of the serrated side surface 411 of the sliding block 4, it is decelerated. When the molten material flows past some teeth of the serrated side surface 411, it can be condensed in the shaping clearance 70.

The grooves 46 formed in the proximate side surface 400 define a concave-and-convex structure, which can create a relatively great resistance to flow of the molten material or the head portion 41 of the sliding blot 4. That is, the sliding block 4 can be pushed easily by the molten material.

Upon completion of the above molding procedure, the air pump can be adjusted to increase the pressure of the compressed air supplied thereby such that the particles or the residual materials are removed from the non-serrated side surface 412 of the sliding block 4 and the inner side surface 200 of the first mold 2 by the two laminar flows, and are discharged out through the runner passage 31 and the vacuum passage 32. When the non-serrated side surface 412 of the sliding block 4 and the inner side surface 200 of the first mold 2 are cleaned, the air pump can be stopped.

Figure 1:
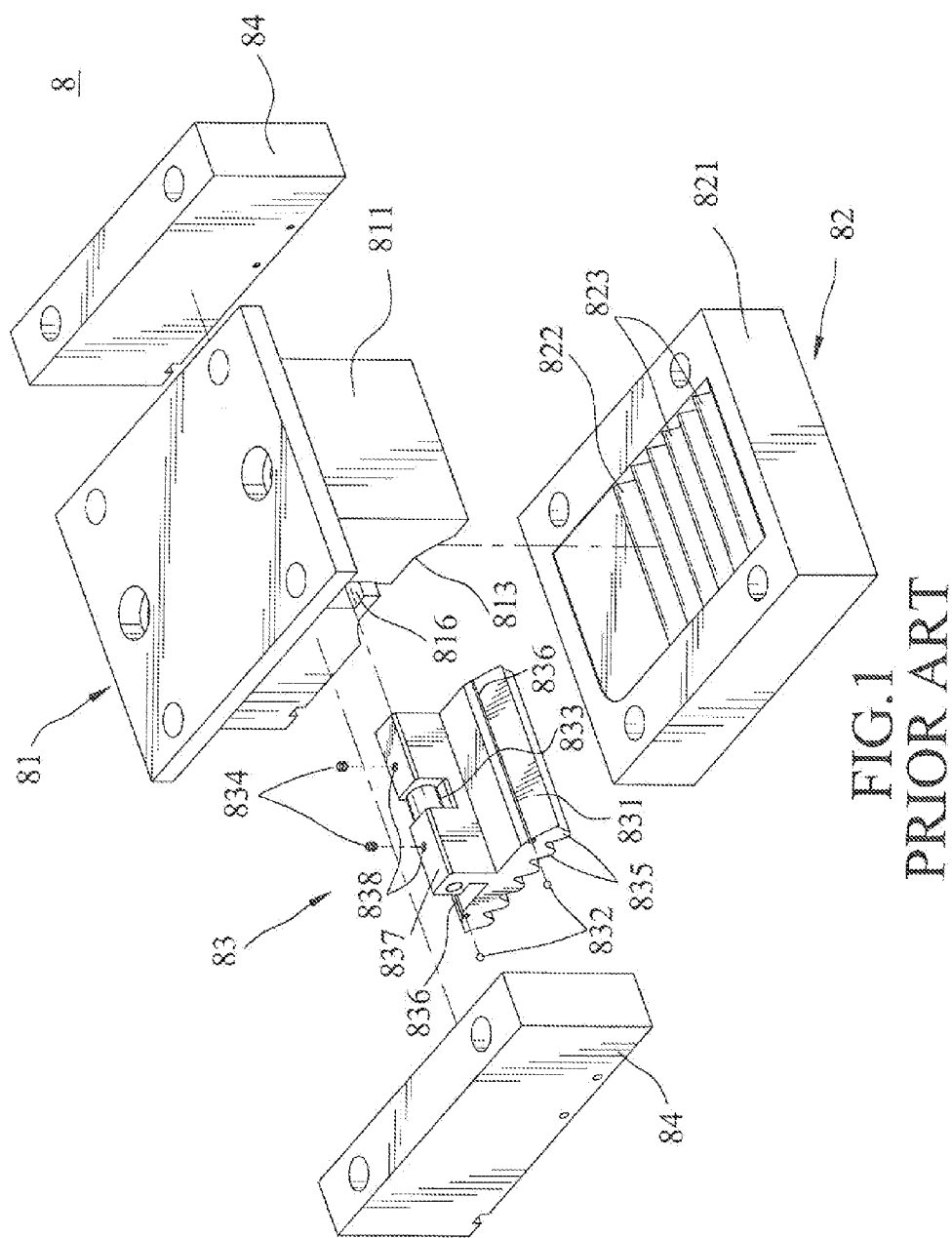
FIG. 1 is a fragmentary exploded perspective view of a conventional mold vacuum valve device disclosed in Taiwanese Patent No. 201231189, a plurality of fasteners being removed for sake of brevity.
Figure 2:
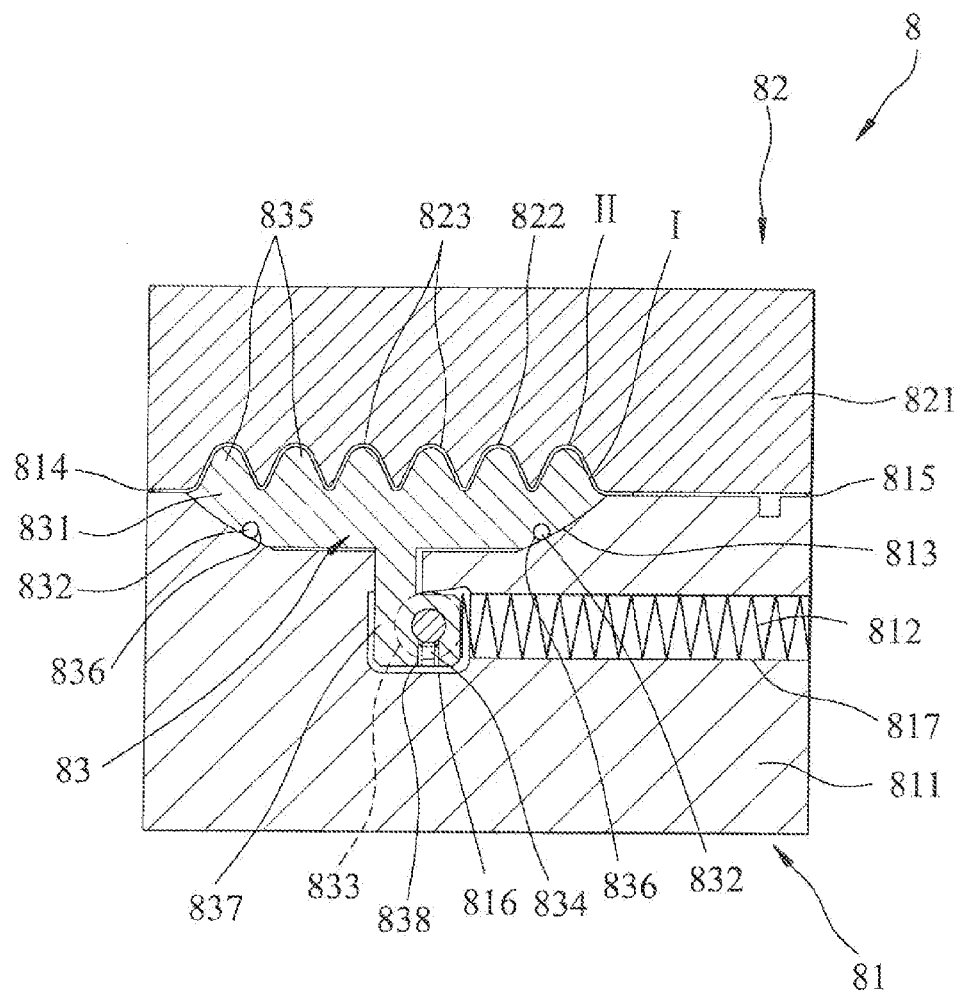
FIG. 2 is a sectional view of the conventional mold vacuum valve device.

To sum up, the mold vacuum valve device of this invention has the following advantages:

1. Since the body portion 42 is cubic, the sliding block 4 can be confined easily between the first mold 2 and the second mold 3 without assistance of additional members, such as the retaining blocks 84 (see FIG. 1). As such, the number of the components of the mold vacuum valve device can be reduced, thereby resulting in an easy assembly and a reduced manufacturing cost.

2. Since the inner side surface 200 of the first mold 2 and the non-serrated side surface 412 of the head portion 41 are flat and parallel to the first direction (X), a pushing force can be applied from the molten material to the sliding block 4 along a direction parallel to the first direction (X). Thus, the whole injection pressure of the molten material can be converted effectively into a force for pushing the sliding block 4. Furthermore, with inclusion of the intake passage 22 in the first mold 2, compressed air can be fed into the mounting hole 20 through the intake passage 22 to thereby facilitate quick formation of the two laminar flows between the non-serrated side surface 412 of the head portion 41 of the sliding block 4 and the inner side surface 200 of the first mold 2. Consequently, the particles and the residue material can be cleaned effectively so that, when pushed by the molten material, the sliding block 4 can move smoothly.

3. Due to the presence of the first coolant passage 23 in the first mold 2 and the second coolant passage 33 in the second mold 3, the mold vacuum valve device can be maintained within an appropriate work temperate range. As such, abnormal operation of the mold vacuum valve device due to excessively high temperature can be prevented.

4. The grooves 46 formed in the proximate side surface 400 define a concave-and-convex structure, which can create a relatively great resistance to flow of the molten material on the head portion 41 of the sliding block 4. That is, the sliding block 4 can be pushed easily by the molten material.

With this invention thus explained, it is apparent that numerous modifications and variations can be made without departing from the scope and spirit of this invention. It is therefore intended that this invention be limited only as indicated by the appended claims.

I claim:

1. A mold vacuum valve device comprising:
    a first mold including an inner side surface and a mounting hole formed therethrough and extending through said inner side surface of said first mold, said mounting hole having a plurality of ball-receiving hole portions at two opposite lateral sides thereof, each of said ball-receiving hole portions extending along a first direction;
    a second mold having an inner side surface abutting against said inner side surface of said first mold and formed with a shaping cavity, a runner passage in fluid communication with a side of said shaping cavity, and a vacuum passage in fluid communication with an opposite side of said shaping cavity, said shaping cavity being defined by a serrated bottom wall surface formed with a plurality of shaping teeth arranged along said first direction and disposed between said runner passage and said vacuum passage, said shaping cavity in said second mold cooperating with said mounting hole in said first mold to define an accommodating space;
    a sliding block disposed movably within said accommodating space and including a head portion having a serrated side surface and a non-serrated side surface that is opposite to said serrated side surface and that is contactable with said inner side surface of said first mold, a body portion extending upwardly from said non-serrated side surface of said head portion and disposed within said mounting hole, and two opposite lateral surfaces formed with a plurality of ball-receiving grooves aligned respectively with said ball-receiving hole portions of said mounting hole in said first mold, said serrated side surface of said head portion being complementary to said serrated bottom wall surface, said head portion cooperating with said second mold to define a shaping clearance therebetween, said shaping clearance having we opposite ends in fluid communication with said runner passage and said vacuum passage, respectively; and
    a rolling unit including a plurality of balls each engaging a respective one of said ball-receiving hole portions and a respective one of said ball-receiving grooves, and a plurality of position-limiting screws threaded respectively into ends of said ball-receiving grooves to confine said balls within said ball-receiving grooves;
    wherein said inner side surface of said first mold and said non-serrated side surface of said head portion are flat, and are parallel to said first direction.

2. The mold vacuum valve device as claimed in claim 1, wherein said sliding block is movable in said accommodating space between an initial position whereat said vacuum passage is opened, and a closing position whereat said vacuum passage is closed, said mold vacuum valve device further comprising a biasing unit for biasing said sliding block to said initial position.

3. The mold vacuum valve device as claimed in claim 2, wherein said first mold further includes opposite first and second sidewalks defining said mounting hole therebetween, a threaded hole formed through said first sidewall, and an adjustment bolt engaged within said threaded hole and extending into said mounting hole, said biasing unit including a return spring for biasing said body portion of said sliding block to contact said adjustment bolt, said adjustment bolt being rotatable within said threaded hole to adjust a size of said shaping clearance when said sliding block is disposed at said initial position.

4. The mold vacuum valve device as claimed in claim 3, wherein said body portion of said sliding block has a blind hole, and said first mold further includes a spring-receiving hole formed through said second sidewall and aligned with said threaded hole, said biasing unit further including a positioning bolt threaded into said spring-receiving hole for confining said return spring in said spring-receiving hole and said blind hole.

5. The mold vacuum valve device as claimed in claim 1, wherein said first mold, further includes an intake passage in fluid communication with said mounting hole.

6. The mold vacuum valve device as claimed in claim 5, wherein said sliding block further includes an airflow guiding hole aligned with and adjacent to said intake passage for accelerating airflow in said mounting hole.

7. The mold vacuum valve device as claimed in claim 1, wherein said first mold further includes a first coolant passage disposed around said mounting hole, said second mold further including a second coolant passage disposed around said shaping cavity.

8. The mold vacuum valve device as claimed in claim 1, wherein said sliding block further includes a proximate side surface adjacent to said runner passage, and a plurality of grooves formed in said proximate side surface and extending along a second direction perpendicular to said first direction.

* * * * *